United States Patent [19]

Koukal

[11] 4,333,635
[45] Jun. 8, 1982

[54] FOLLOW-UP CONTROL MEANS IN SWINGING-ARM FLAME-CUTTING MACHINES

[76] Inventor: Anton Koukal, Pfarrstrasse 6, 7326 Heiningen, Fed. Rep. of Germany

[21] Appl. No.: 97,121

[22] Filed: Nov. 26, 1979

[51] Int. Cl.³ .............................................. B23K 7/10
[52] U.S. Cl. ...................................... 266/64; 266/62; 266/72; 409/96; 409/97
[58] Field of Search .................. 266/58, 60, 62, 63, 266/64, 72; 83/565; 33/24 R, 24 C; 409/96, 97, 104, 110, 111, 112

[56] References Cited

U.S. PATENT DOCUMENTS

| 2,040,914 | 5/1936 | Anderson | 266/62 |
| 2,178,938 | 11/1939 | Ohmstede | 33/24 C |
| 3,075,758 | 1/1963 | Gloor | 266/62 |
| 3,660,665 | 5/1972 | Luker | 266/60 |
| 3,812,412 | 5/1974 | Hahn et al. | 266/60 |

FOREIGN PATENT DOCUMENTS 2732056  1/1979  Fed. Rep. of Germany.

Primary Examiner—L. Dewayne Rutledge
Assistant Examiner—John P. Sheehan
Attorney, Agent, or Firm—Craig and Antonelli

[57] ABSTRACT

The present invention relates to follow-up control means in swinging-arm flame-cutting machines comprising a scanning element which is arranged at outer component arm of the swinging arm carrying the cutting torch, and in coaxial relation to the latter and which is advanced by drive means likewise arranged on the outer component arm to follow automatically the contour of a pattern having the configuration of a part to be cut from a workpiece.

6 Claims, 4 Drawing Figures

FOLLOW-UP CONTROL MEANS IN SWINGING-ARM FLAME-CUTTING MACHINES

Flame-cutting machines enabling a part whose configuration is determined by the contour of a pattern to be cut from a plate-shaped workpiece are designed either as coordinate flame-cutting machines having the torch mounted to a cross-slide for controlled movement in two X and Y coordinate directions forming between them a right angle, or else as swinging-arm flame-cutting machines with a swinging-arm comprising at least two arm component arms arranged to swivel in relation to each other, one of them being hinged on the machine column and the other, i.e. the outer one carrying the torch.

In the case of cross-slide flame-cutting machines it is relatively easy to achieve a follow-up control by photoelectric means because the design of such machines provides a cartesian coordinate system defined in fixed orientation by the guide elements of the cross-slide and because the angular positions assumed by a photo-electric scanning head relative to such coordinate system when following the contour of a tracing and adapting itself to the different directions of such contour can be easily transformed into control signals for the drive of the cross-slide by means of suitable potentiometric pick-up means. Swinging-arm flame-cutting machines, however, do not offer such a fixed coordinate system, and even when the torch or a scanning head connected to the latter move along a straight line, the angles formed between the individual component arms of the swinging arm or between the individual components and a fixed straight reference line vary continuously.

In an effort to make swinging-arm flame-cutting machines also suitable for cutting a part according to a pattern, an automatic follow-up control using fixed iron templets was developed which has a driven magnetic roller provided at the swinging-arm above the torch. This roller follows the contour of the templet, thus guiding the swinging-arm and the torch along a cutting line conforming to such contour.

The disadvantage of this type of follow-up control mainly lies in the fact that the manufacture of the necessary iron templets is rather complicated and, as a result, expensive so that they can be profitably employed only for large series.

Therefore, it is the primary object of the present invention to provide follow-up control means for swinging-arm flame-cutting machines of the type using photo-electric means for scanning the contour of a pattern, which will permit the use of a tracing, or quite generally of any pattern marking the contour of a part to be cut by optical contrast, also for the follow-up control of such flame-cutting machines.

According to the invention, this object is achieved in an extremely simple manner by the characterizing features (a) to (d) of the main claim:

(a) the scanning element comprises a photo-electric scanning head which together with the feeding means forms an assembly seated at the outer guide rod of the swinging-arm for the rotation about the torch axis;

(b) the feeding means comprises a feed wheel which is driven by a feed motor and which rides on an end plate fixed to the frame of the frame-cutting machine which extends in parallel to the supporting surface for the pattern and to the plane of movement ot the torch, respectively, the point of contact between the feed wheel and the said end plate being arranged at the point where the torch axis projects through the contact surface of the end plate, and the center plane of the said feed wheel which comprises the torch axis extending perpendicularly to its axis of rotation;

(c) the scanning head comprises a conventional arrangement of photo-electric detectors picking up the directional changes of the contour of the pattern and generating a control signal characteristic of any deviation of the contour of the pattern from the momentary feeding direction, which singal is supplied to a swivel control motor which, in response to the said control signal, totates the scanning head together with the drive means into the orientation conforming to the contour of the pattern;

(d) the pattern is arranged in a plane extending between the scanning head and the workpiece and in parallel to the latter and to the end plate, and the torch is connected with the outer guide arm by means of a U-shaped arm encompassing the pattern at a certain distance.

The function of the follow-up control of the invention is as follows

A photo-electric scanning head scanning the pattern, for example a drawing or tracing, and varying its rotational orientation in response to the directional changes of the contour of the tracing is continuously guided along the contour of the tracing by means of the feeding means which follows the rotational movements of the scanning head. The feed wheel of the feeding means bears against and rides on an end plate fixed to the machine in parallel relation to the tracing and/or the workpiece. Thus, the torch continuously moves along the path defined by the contour of the tracing since the central axis of the torch is in alignment with the axis of rotation of the scanning head which in turn forms a right angle with the plane of the tracing. The mechanical means necessary for carrying out the follow-up control of the invention, i.e. the scanning head and the feed means following the latter's rotational movements are of very simple design and provided in very compact arrangement along the torch axis, i.e. the axis of rotation. The possibility created by the invention for swinging-arm flame-cutting machines, namely to operate from an optically contrasting pattern, in particular a tracing, will considerably extend the field in which swinging-arm flame-cutting machines can be economically employed.

According to further objects of the invention the scanning head and the feeding means are seated at the bottom plate and the top plate respectively, of a substantially cuboid housing that can be attached to the outer component arm 14 of the swinging-arm of a conventional swinging-arm flame-cutting machine, the housing enclosing also the swivel control motor and a swivel control gear forming a positive coupling between the said swinging motor and the scanning head and the torch can be fastened in the position in which its axis is in alignment with the axis of the scanning head at the free end of an intermediate piece which carries at its other end a mounting plug that can be inserted into the torch holder of the flame-cutting machine and fixed therein against rotation. This offers the advantage that a swinging-arm flame-cutting machine controlled by conventional means—for instance by means of a magnetic roller—can be most easily equipped with the control means of the invention. To this end, either the control unit of the conventional machine can be replaced by the assembly comprising the scanning head and the drive means, or else the said assembly can be additionally mounted at the outer guide arm of the swinging-arm, in which latter case the torch must be rigidly connected in the arrangement of the invention to the torch carrier of the machine using a suitable connector.

According to a further object of the invention the shaft of the scanning head is seated in an antifriction roller bearing fixed to the bottom plate of the housing and provided with an end portion projecting through and beyond the top plate of the housing, that the said end portion is enclosed by a hollow-cylindrical sleeve connected with the said end portion for controlled movement in the axial direction and for rotation therewith, the free end of the said sleeve carrying the feeding means and the sleeve being slidingly in an antifriction roller bearing at the top plate of the housing and that a pre-stressed spiral compression spring coaxially enclsoing the shaft of the scanning head is arranged between a radially extending supporting surface of the sleeve in the housing and a radially extending supporting surface of the shaft of the scanning head, arranged at a distance to the said supporting surface.

The embodiment of the arrangement of the invention in accordance with these features ensures that the driven feed wheel is maintained in contact with the end plate at the minimum contact pressure required, which ensures the uniform torch feed which is essential for the achievement of smooth cuts.

According to still a further object of the invention the mass of the feeding means arranged at the one side of the feed wheel is balanced by an equal mass on the opposite side of the feed wheel, and that these masses arranged on either sides of the feed wheel and rotating therewith about the common axis of rotation have the same moment of inertia with respect to this axis. Thereby it is achieved that any centrifugal forces resulting from a rotation of the feeding means about their common axis of rotation of the scanning head and the feeding means are compensated by the counteracting centrifugal forces resulting from the rotation of the balancing mass.

Other details and features of the invention will be apparent from the followng description of certain embodiments of the invention in conjunction with the drawing, in which.

Figure 1:
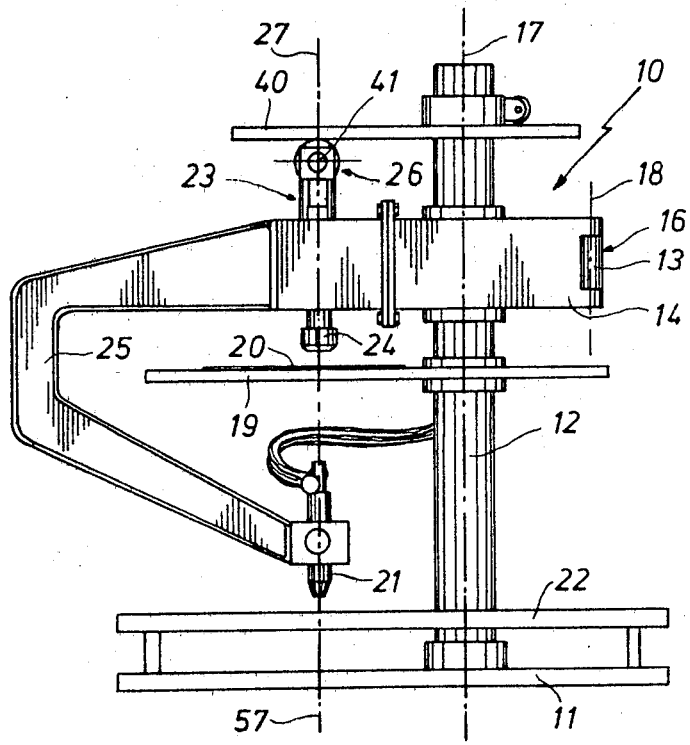
FIG. 1 is a front view of a swinging-arm flame-cutting machine comprising a follow-up control in accordance with the invention having a photoelectric scanning head with feeding means, mounted to rotate about the torch axis.

The swinging-arm flame-cutting machine 10 shown in FIG. 1 comprises a column 12 mounted in perpendicular arrangement upon a base plate 11. As can be seen in FIG. 1, the details of which are expressly incorporated herein by reference, the swinging-arm generally indicated at 16 and comprising two guide arms 13 and 14 is mounted to pivot in a horizontal plane about the said column 12. The one arm component 13 can swing about the vertical longitudinal axis 17 of the column 12, whereas the second arm component 14 can swing about the likewise vertical pivot axis 18 of the joint connecting the two arms 13 and 14, as can be best seen from FIG. 2. Mounted to column 12 below the swinging arm 16—FIG. 1—is a horizontal supporting plate 19 for a tracing 20 the contour of which represents the cutting path of a torch 21 which is to cut a part from a workpiece 22—for instance a steel plate horizontally supported upon the base plate 11 of the flame-cutting machine 10 at a distance of a few centimeters—the contour of the said part corresponding to that of the tracing 20, except for the deviation caused by the width of the cut.

The follow-up control means—generally indicated at 23—provided in accordance with the invention for automatically controlling the necessary movements of the torch 21 along the predetermined path takes the form of an assembly fixed to the free end of the outer guide arm 14 of the swinging-arm 16. In the embodiment shown, this assembly also comprises a U-shaped torch carrier 25 encompassing the supporting plate 19 and providing a rigid connection between the torch 21 and the outer guide arm 14.

The essential functional components of the follow-up control means 23 consist of a photo-electric scanning head 24 picking up the direction of the contour of the tracing, and feeding means 26 adapting the effective feed direction automatically to the direction of the contour of the tracing picked up by the scanning head 24. As a result, the scanning head 24 will—except for neglectable deviations, resulting from the control process—follow the contour of the tracing exactly and at the speed determined by the feeding means and the torch 21 arranged exactly below the scanning head 24 will move along a cutting path conforming to the contour of the tracing with the same degree of exactitude.

Hereafter, the structure and function of the follow-up control means 23 of the invention will be described in greater detail with reference to FIG. 3, the relevant details of which are herewith expressly incorporated in this specification by reference.

The scanning head 24 and the feeding means 26 are coupled to rotate together about a common axis 27 fastened to an substantially cuboid housing 28, which in turn is mounted at the free face of the outer guide arm 14 of the swinging-arm 16 via a vertical mounting plate 29. The scanning head 24 arranged underneath the horizontal bottom plate 30 of the housing 28 is equipped with an extended shaft 31 which in its lower section adjacent the scanning head 24 is supported in a roller bearing 32 fixed to the bottom plate 30 of the housing 28.

The scanning head 24 which as such is of conventional design comprises a plurality of photo-electric detectors not shown in detail which have their detector surfaces arranged in the image plane of an image-forming element forming an image of that contour section of the tracing which is at any moment below the scanning head 24. Due to the special symmetry of the detector arrangement, an orientation or angular position of the scanning head 24 is defined which also determines the momentarily effective feeding direction of the feeding means 26. As long as the direction of the contour of the tracing or of the image formed of said tracing coincides with the said orientation of the scanning head 24 or the feeding direction, respectively, an error voltage signal emitted by the detector arrangement is a zero-voltage signal. But when in the course of the feeding motion the direction of the contour of the tracing deviates from the said orientation of the scanning head or its feeding direction in the clock-wise or counter-clockwise sense, the detector arrangement will immediately emit an error voltage signal of a polarity—positive or negative—characteristical of the sense of deviation and of a magnitude characteristic of the magnitude of the deviation. These error signals, which may if necessary be amplified in a suitable manner, drive a servo-motor 33 whose sense of rotation changes in response to the polarity of the signal. The servo-motor 33 is installed in the housing 28 and has its power take-off shaft coupled to the shaft 31 of the scanning head 24 via a reduction gear generally indicated at 34. Thus, the scanning head 24 and the control means comprising the servo-motor 33 and the reduction gear 34 form a control circuit ensuring the conformity between the feeding direction of the feeding means 26 and the direction of the contour of the tracing and guiding, as a result, the torch 21 along the cutting path predetermined by the contour of the tracing. The feeding means 26 connected with the scanning head 24 so as to rotate therewith, is arranged above the housing 28. It comprises an electric drive motor 36 with flange-mounted reduction gear 37 having its drive shaft 38 extending along a horizontal plane. The drive shaft 38 carries a feed wheel 39 riding on the bottom of a horizontal end plate 40 fastened at a suitable height on the column 12 of the machine frame.

The arrangement of the feed wheel 39 is such that its—horizontal—axis of rotation 41 crosses the common axis of rotation 27 of the scanning head 24 and the feeding means 26 at a right angle and that the center plane 55 (see FIG. 2) of the feed wheel 39 which extends perpendicularly to its horizontal axis of rotation 41 assumes in the horizontal direction the orientation defined by the detector arrangement of the scanning head 24, which means that the point of contact 42 between the feed wheel 39 and the bottom 43 of the end plate 40 is to be found on the vertical axis of rotation 27 which is common to the scanning head 24 and the feeding means 26.

The connection between the feeding means 26 and the scanning head 24 for common rotation is achieved by a cylindrical sleeve 44 which encloses in coaxial relation an upper portion 47 of the shaft 31 of the scanning head. This upper portion 47 of the shaft 31 is extending through and beyond the top plate 46 of the housing 28. The lower portion of the sleeve 44 enclosing the upper portion 47 of the shaft 31 is seated at the top-plate 46 of the housing 28 in a ball-hearing 48 which permits an axial displacement of the sleeve 44.

The drive unit comprising the feed motor 36 and the feed wheel 39 is supported by a vertical mounting plate 49 rigidly fastened to the outside of the upper portion of the sleeve 44, for instance by welding. A radially extending drive pin 50 is inserted into the upper end portion of the shaft 31 of the scanning head 24 and projects through a vertically extending oblong hole 51 in the sleeve 44, the interior width of the hole 51 corresponding to the diameter of the drive pin 50. With the aid of this drive pin, the sleeve is connected to the shaft 31 of the scanning head 24 to rotate therewith and guided for displacement in the direction of the common axis of rotation 27. Between the lower annular end face 52 of the sleeve 44 an the upper radial end face 53 of a slip ring body 54 which is rigidly seated on the shaft 31 and which serves to supply the feeding means 26 and the scanning head 24 with the necessary current, a pre-stressed spiral compression spring 56 is provided which maintains the necessary contact pressure between the feed wheel and the end plate 40. Reference number 57 indicates a brush holder carrying the contact brushes which are in sliding contact with the slip rings of the slip ring body 54.

Figure 2:
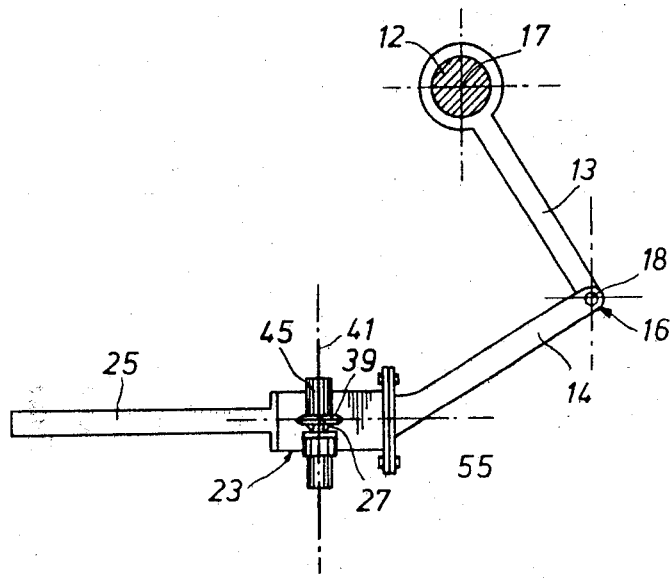
FIG. 2 is a simplified top view of the swinging-arm of the swinging-arm flame-cutting machine of FIG. 1, with the follow-up control means attached to the outer guide arm.
Figure 3:
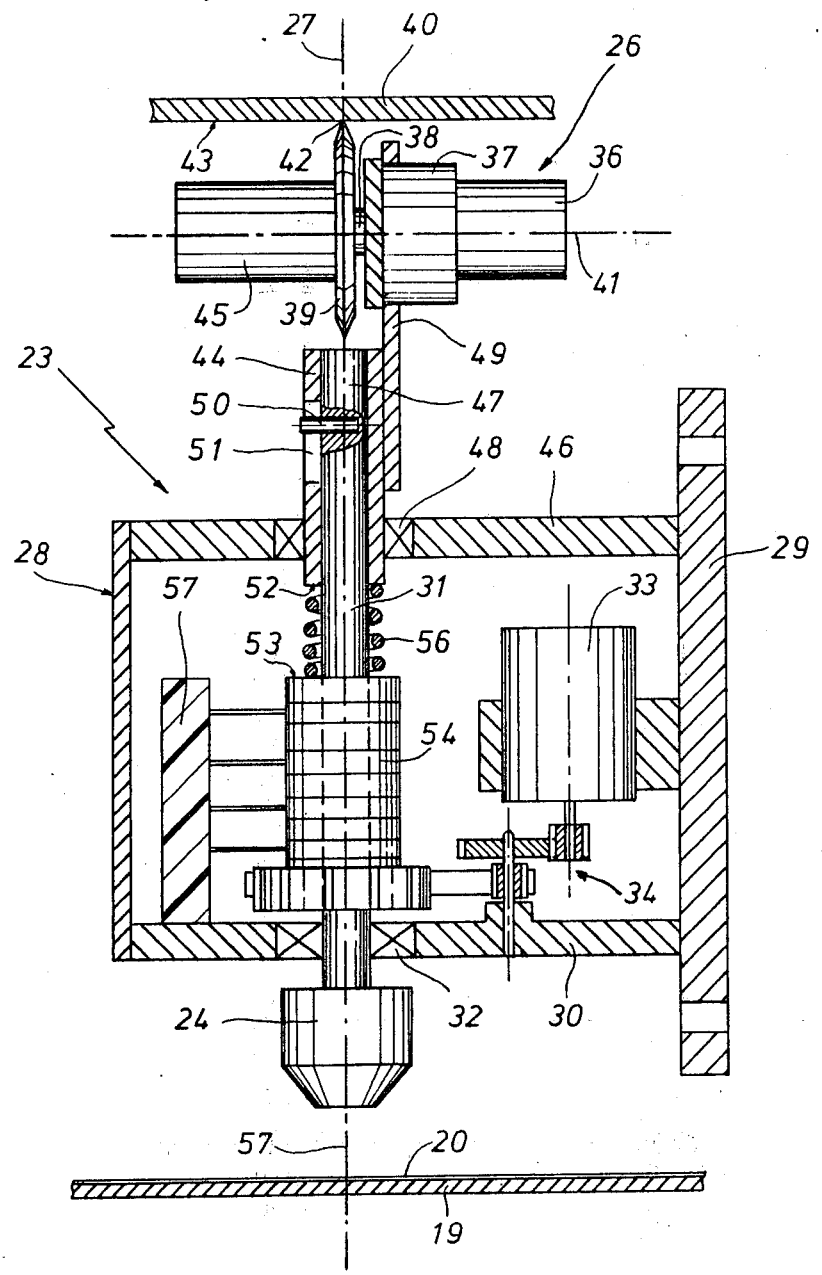
FIG. 3 is a section along a center plane of a housing comprising the axis of rotation of the scanning head, showing details of the arrangement of the scanning head and the feeding means between an end plate of the flame-cutting machine and the pattern.
Figure 4:
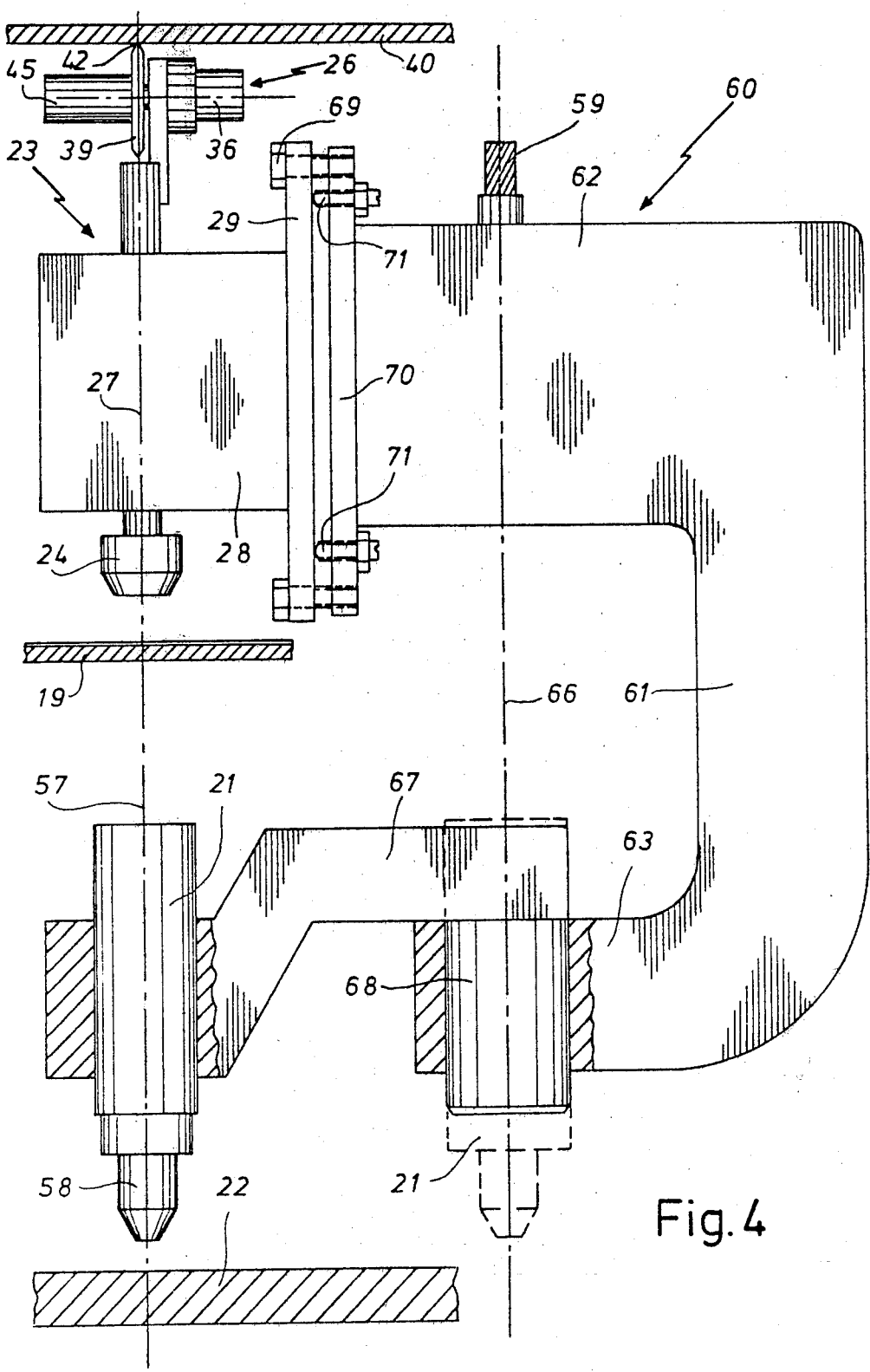
FIG. 4 is a part-sectional drawing in accordance with FIG. 2, showing details of an embodiment of the invention suitable for use in connection with a conventional swinging-arm flame-cutting machine.

As shown in FIGS. 2 to 4, the masses of the drive motor 36, its reduction gear 37, and of the mounting plate 49 connecting the feed means 2 with the sleeve 44 which are arranged at the one side of the center plane 55 of the feed wheel 39 are balanced by a steel cylinder 45 which is arranged at the other side of the center plane 55 of the feed wheel 39 and firmly connected to the latter. In the special arrangement as shown, the steel cylinder 45 is extending from the feed wheel 39 along its horizontal axis of rotation 41. The moment of inertia of steel cylinder 45 with respect to the common vertical axis of rotation 27 is the same as that of the masses arranged at the opposite side of center plane 55 of the feed wheel 39 and the vertical axis of rotation 27, respectively. The result of this mass-distribution is, that any centrifugal forces forces resulting from a rotation of scanning head 24 and of the elements connected therewith are mutually compensated, and the scanning head 24 will not deviate from its path as determined by the contour of the tracing 20 even if the radius of curvature of any contour portion is very small.

In the embodiment shown in FIGS. 1, 2 and 3, as well as in the embodiment shown in FIG. 4 which will be explained hereafter, the torch 21 is always arranged so that its vertical longitudinal axis 57 and the axis of the flame-cutting nozzle 58 coincide with the common axis of rotation 27 of the scanning head 24 and the feeding means 26. This ensures that the path of movement of the torch 21 conforms exactly to that of the scanning head 24 and, thus, to the contour of the tracing.

In the embodiment shown in FIG. 4, in which individual components which are identical to or have the same function as the corresponding components of FIGS. 1, 2 and 3 are indicated by the same reference numbers, the follow-up control 23 is particularly suited for the equipment of a conventional swinging-arm flame-cutting machine 60 using a driven magnetic roller 59 and iron templets with the photo-electric follow-up control of the invention. For simplicity's sake, only the outer guide arm 61 of this flame-cutting machine 60 is shown, which in this case takes the form of an U-shaped frame with horizontally extending legs 62 and 63 and a vertically extending yoke, and carrying at its upper horizontal leg 62 the magnetic roller 59 and its drive means (not shown). The lower horizontally extending leg 63 carries in the conventional arrangement the cutting torch 21 in the position indicated by dotted lines, with the longitudinal axis 66 of the said torch 21 coinciding with the axis of rotation of the magnetic roller 59. In the arrangement of the invention, which is shown in full lines, the torch 21 is carried on the free end of an intermediate piece 67 which in turn can be fixed to the torch holder of the outer guide arm 61 by means of a mounting plug 68. The assembly 23 which comprises the housing 28 with the photo-electric scanning head 24 and the feeding means 26 and which is shown in more detail in FIG. 2, is fastened by means of mounting screws 69 to a flange plate 70 arranged at the free face of the upper leg 62. The torch axis 57 and the axis of rotation of the scanning head 24 can be exactly brought into the correct alignment, which is an essential feature of the present invention, by means of spacer screws 71 guided in screwing relationship in the flange plate 70 and bearing against the side of the mounting plate 29 facing the flange plate 70, and by means of the intermediate piece 67 arranged at the lower leg 63, which can be rotated and fixed in the correct position.

What we claim is:

1. Follow-up control means in swinging-arm flame-cutting machines comprising a scanning element which is arranged at the outer component arm of the swinging arm carrying the cutting torch, and in coaxial relation to the latter and which is advanced by drive means likewise arranged on the outer component arm to follow automatically the contour of a pattern having the configuration of a part to be cut from a workpiece, characterized by the following features:
    (a) the scanning element comprises a photo-electric scanning head (24) which together with the feeding means (26) forms an assembly (23) seated at the outer guide rod (14) of the swinging-arm (16) for rotation about the torch axis (57, 27);
    (b) the feeding means (26) comprises a feed wheel (39) which is driven by a feed motor (36) and which rides on an end plate (40) fixed to the frame of the flame-cutting machine (10, 60) which extends in parallel to the supporting surface (19) for the pattern (20) and to the plane of movement of the torch (21), respectively the point of contact (42) between the feed wheel (39) and the said end plate being arranged at the point where the torch axis (57, 27) projects through the contact surface (43) of the end plate (40), and the center plane of the said feed wheel (39) which comprises the torch axis (57, 27) extending perpendicularly to its axis of rotation (41);
    (c) the scanning head (24) comprises a conventional arrangement of photo-electric detectors picking up the directional changes of the contour of the pattern and generating a control signal characteristic of any deviation of the contour of the pattern (20) from the momentary feeding direction, which signal is supplied to a swivel control motor (33) which, in response to the said control signal, rotates the scanning head (24) together with the drive means (26) into the orientation conforming to the contour of the pattern;
    (d) the pattern (20) is arranged in a plane extending between the scanning head (24) and the workpiece and in parallel to the latter and to the end plate (40), and the torch (21) is connected with the outer guide arm (14) by means of a U-shaped arm (24) encompassing the pattern (20) at a certain distance.

2. A device in accordance with claim 1, characterized in that the scanning head (24) and the feeding means (26) are seated at the bottom plate (30) and the top plate (46), respectively, of a substantially cuboid housing (28) that can be attached to the outer guide arm (14) of the swinging arm of a conventional swinging-arm flame-cutting machine, the housing (28) enclosing also the swivel control motor (33) and a swinging swivel control gear (34) forming a positive coupling between the said swinging motor and the scanning head (24).

3. A device in accordance with claim 2, characterized in that the torch can be fastened in the position in which its axis (57) is in alignment with the axis (27) of the scanning head (24) at the free end of an intermediate piece (67) which carries at its other end a mounting plug (68) that can be inserted into the torch holder (63) of the flame-cutting machine (60) and fixed therein against rotation.

4. A device in accordance with claim 2 or claim 3, characterized in that the shaft (31) of the scanning head (24) is seated in an antifriction roller bearing (32) fixed to the bottom plate (30) of the housing (28) and provided with an end portion (47) projecting through and beyond the top plate (46) of the housing (28), that the said end portion (47) is enclosed by a hollow-cylindrical sleeve (44) connected with the said end portion for controlled movement in the axial direction and for rotation therewith, the free end of the said sleeve (44) carrying the feeding means (26) and the sleeve being slidingly seated in an antifriction roller bearing (48) at the top plate (46) of the housing (28) and that a pre-stressed spiral compression spring (56) coaxially enclosing the shaft (31) of the scanning head is arranged between a radially extending supporting surface (52) of the sleeve (44) in the housing (28) and a radially extending supporting surface (53) of the shaft (31) of the scanning head, arranged at a distance to the said supporting surface (52).

5. A device in accordance with any of claims, 1 or 2 or 3 characterized in that the mass of the feeding means (26) arranged at the one side of the feed wheel (39) is balanced by an equal mass (45) on the opposite side of the feed wheel, and that these masses arranged on either sides of the feed wheel and rotating therewith about the torch axis of rotation (27) have the same moment of inertia with respect to this axis (27).

6. A device in accordance with claim 4, characterized in that the mass of the feeding means (26) arranged at the one side of the feed wheel (39) is balanced by an equal mass (45) on the opposite side of the feed wheel, and that these masses arranged on either sides of the feed wheel and rotating therewith about the torch axis of rotation (27) have the same moment of inertia with respect to this axis (27).

* * * * *